United States Patent
Tanaka et al.

(10) Patent No.: US 7,235,947 B2
(45) Date of Patent: Jun. 26, 2007

(54) SYNCHRONOUS MOTOR CONTROL METHOD AND SYNCHRONOUS MOTOR CONTROL SYSTEM

(75) Inventors: Hideki Tanaka, Amagasaki (JP); Shinji Kajihara, Kobe (JP); Tsuyoshi Maehara, Itami (JP); Tetsuya Kubota, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 77 days.

(21) Appl. No.: 11/283,728

(22) Filed: Nov. 22, 2005

(65) Prior Publication Data

US 2006/0108967 A1    May 25, 2006

(30) Foreign Application Priority Data

Nov. 25, 2004  (JP) .............................. 2004-340505

(51) Int. Cl.
*H02P 1/46* (2006.01)
(52) U.S. Cl. .................. 318/712; 318/701; 318/727; 318/700; 318/716; 318/718; 318/717
(58) Field of Classification Search ................ 318/712, 318/701, 727, 700, 716, 718, 717
See application file for complete search history.

(56) References Cited

U.S. PATENT DOCUMENTS

| 6,362,586 B1 | 3/2002 | Naidu |
| 6,605,912 B1 | 8/2003 | Bharadwaj et al. |
| 2004/0201358 A1* | 10/2004 | Kawaji et al. ............... 318/701 |
| 2005/0049770 A1* | 3/2005 | Liu et al. ...................... 701/43 |

FOREIGN PATENT DOCUMENTS

| EP | 0 638 457 A | 2/1995 |
| JP | A 9-84400 | 3/1997 |
| JP | A 11-018498 | 1/1999 |

* cited by examiner

*Primary Examiner*—Karen Masih
(74) *Attorney, Agent, or Firm*—Oliff & Berridge, PLC

(57) ABSTRACT

A desired q-axis current is determined based on a desired torque, and a desired d-axis current is determined based on the rotating speed of a synchronous motor when the terminal voltage of the synchronous motor coincides with a predetermined maximum permissible voltage to weaken a magnetic field created by the synchronous motor equivalently and to prevent the drop of the output torque of the synchronous motor. The desired d-axis current is determined based on the desired torque and the rotating speed. Therefore, the desired d-axis current can be reduced when a high torque is not necessary and undesired increase of the desired d-axis current can be prevented. Thus the synchronous motor operates efficiently, heat generation of the synchronous motor is prevented and power factor is improved.

7 Claims, 10 Drawing Sheets

SYNCHRONOUS MOTOR CONTROL METHOD AND SYNCHRONOUS MOTOR CONTROL SYSTEM

CROSS REFERENCE TO RELATED APPLICATIONS

This application is based upon the prior Japanese Patent Application No. 2004-340505 filed on Nov. 25, 2004, the entire contents of which are incorporated herein by reference.

BACKGROUND OF THE INVENTION

1. Field of the Invention

The present invention relates to a synchronous motor control method and a synchronous motor control system.

2. Description of the Related Art

In a synchronous motor, induced voltage produced by speed electromotive force increases with the increase of the rotating speed of the rotor of the synchronous motor. The polarity of the induced voltage is opposite that of the output inverter voltage of an inverter circuit. Therefore, increase in the induced voltage causes the output torque of the synchronous motor to decrease. If the voltage across the terminals of the synchronous motor drops instantly, the output torque of the synchronous motor decreases furthermore.

Therefore, when high rotating speed and high torque are necessary, a high-speed synchronous motor must be employed instead of a low-speed synchronous motor. The allowable maximum current and allowable maximum voltage of the high-speed synchronous motor are high, the high-speed synchronous motor is inevitably large and the manufacturing cost of the high-speed synchronous motor is high.

There is a mounting demand for space reduction and cost reduction in recent years, then, efforts have been made in recent years to make a low-speed synchronous motor produce a high torque when the rotating speed is high. From the point of view of miniaturization and improvement of efficiency, suppression of heat generation during operation and power factor improvement are desired.

First and second prior control methods of controlling a synchronous motor to improve the speed-torque characteristic of the synchronous motor are disclosed in Japanese Patent Laid-Open Publication (JP-A) 11-18498 and Japanese Patent Laid-Open Publication (JP-A) 9-84400. The first control method disclosed in JP-A 11-18498 makes a predetermined d-axis current flow during high-speed operation. The first control method increases the d-axis current according to a value obtained by multiplying the rotating speed by a predetermined constant. The second control method disclosed in JP-A 9-84400 supplies a d-axis current only during high-speed operation and increases the d-axis current according to the rotating speed of the rotor. The second control method starts supplying the d-axis current at a first set speed near a speed at which voltage saturates, increases the d-axis current according to a linear increasing function and fixes the d-axis current at a fixed value upon the increase of the rotating speed to a second predetermined speed. The first and the second control method control the d-axis current on the basis of the rotating speed to suppress the reduction of the output torque due to the increase of the induced voltage with the increase of the rotating speed.

The first and the second control methods only control the d-axis current on the basis of the rotating speed. Consequently, a d-current corresponding to a rotating speed flows even in a state where a low torque is necessary. The prior control methods supplies the d-axis current regardless of a necessary torque. Therefore, it is very probable that an excessively high current is supplied to the synchronous motor. Consequently, the improvement of the efficiency of the synchronous motor is obstructed, the synchronous motor generates heat at a high rate and the power factor decreases.

SUMMARY OF THE INVENTION

Accordingly, it is an object of the present invention to provide a synchronous motor control method and system for controlling a synchronous motor, capable of making the synchronous motor produce high torque at a high rotating speed and of improving the efficiency of the synchronous motor.

A synchronous motor control method in a first aspect of the present invention is a method of controlling a synchronous motor by determining a current to be supplied to the synchronous motor based on a value obtained through a d-q-axis transformation of a current flowing through the synchronous motor, comprising: determining a desired q-axis current corresponding to a q-axis current of the synchronous motor based on a desired torque corresponding to an output torque of the synchronous motor with keeping a desired d-axis current corresponding to a d-axis current of the synchronous motor at zero, until a terminal voltage of the synchronous motor reaches a predetermined maximum permissible voltage; and determining the desired q-axis current based on the desired torque and determining the desired d-axis current based on a rotating speed of the synchronous motor and the desired torque, when the terminal voltage of the synchronous motor has reached the predetermined maximum permissible voltage.

Preferably, in the synchronous motor control method according to the present invention, the desired d-axis current is determined so as to meet a condition expressed by:

$$I_{dc} = I_{qc} \cdot \tan\{K_1 \cdot (\omega - \omega_{m1})\} \quad (1)$$

where $\omega_{m1}$ is a specified rotating speed of the synchronous motor producing a maximum torque when the terminal voltage is equal to the predetermined maximum permissible voltage, $\omega$ is the rotating speed of the synchronous motor, $K_1$ is a predetermined constant or a variable, $I_{qc}$ is the desired q-axis current determined based on the desired torque and $I_{dc}$ is the desired d-axis current.

The specified rotating speed is dependent on the characteristic of the synchronous motor and is specific to the synchronous motor. If the specified rotating speed cannot be accurately determined, $\omega_{m1}$ may be a value approximately equal to the specified rotating speed.

Preferably, in the synchronous motor control method according to the present invention, when a determined desired d-axis current exceeds a maximum field-weakening current which limits weakening a magnetic field created in the synchronous motor, the desired d-axis current is redetermined so as to be equal to the maximum field-weakening current.

Preferably, in the synchronous motor control method according to the present invention, when a determined desired d-axis current exceeds a maximum field-weakening current which limits weakening a magnetic field created in the synchronous motor, the desired d-axis current is redetermined so as to be equal to the maximum field-weakening current.

Preferably, in the synchronous motor control method according to the present invention, when a current flowing through the synchronous motor according to determined desired q-axis and d-axis currents exceeds a predetermined maximum permissible current, the desired d-axis current is redetermined so that a current supplied to the synchronous motor is not higher than a maximum permissible current without changing the desired q-axis current determined based on the desired torque, and an adjusted desired q-axis voltage corresponding to a q-axis component of the terminal voltage of the synchronous motor is determined by subtracting a compensating voltage determined for the rotating speed from a desired q-axis voltage determined based on the desired q-axis current.

Preferably, in the synchronous motor control method according to the present invention, the compensating voltage is determined so as to meet a condition expressed by:

$$V_{qe} = K_2 \cdot \omega \cdot I_{qc} + K_3 \cdot \omega \cdot I_d$$

where $I_{qc}$ is the desired q-axis current, $I_d$ is the d-axis current flowing through the synchronous motor, $\omega$ is the rotating speed of the synchronous motor, $K_2$ and $K_3$ are predetermined constants or variables and $V_{q3}$ is the compensating voltage.

A synchronous motor control system in a second aspect of the present invention is a system for controlling a synchronous motor by determining a current to be supplied to the synchronous motor based on a value obtained through a d-q-axis transformation of a current flowing through the synchronous motor, comprising: a speed measuring means for measuring a rotating speed of the synchronous motor; and an arithmetic means for determining desired q-axis and desired d-axis currents to be supplied to the synchronous motor so that the rotating speed coincides with a desired rotating speed; wherein the desired q-axis current corresponding to a q-axis current of the synchronous motor is determined based on a desired torque corresponding to an output torque of the synchronous motor with keeping the desired d-axis current corresponding to a d-axis current of the synchronous motor at zero when a measured rotating speed measured by the speed measuring means is not higher than a specified rotating speed at which the synchronous motor produces a maximum torque when a terminal voltage of the synchronous motor coincides with a predetermined maximum permissible voltage, and the desired q-axis current is determined based on the desired torque, and the desired d-axis current is determined based on the rotating speed of the synchronous motor and the desired torque when the measured rotating speed measured by the speed measuring means is higher than the specified rotating speed.

In the synchronous motor control method in the first aspect of the present invention, an induced voltage induced in the synchronous motor to produce force resisting the operation of the synchronous motor increases as the rotating speed increases. Therefore, voltage to be applied to the synchronous motor to make the synchronous motor produce a necessary torque increases as the rotating speed increases.

The desired q-axis current is determined on the basis of a desired torque until the terminal voltage for the synchronous motor increases to the maximum permissible voltage. After the terminal voltage for the synchronous motor has increased to the maximum permissible voltage, the desired q-axis current is determined on the basis of the desired torque and the d-axis current to be supplied to the synchronous motor is determined on the basis of the rotating speed of the synchronous motor and the desired torque. The strength of a magnetic field created by the synchronous motor can be equivalently reduced by supplying the desired d-axis current thus determined to the synchronous motor and the drop of the output torque of the synchronous motor can be suppressed without increasing the terminal voltage. Thus the terminal voltage is prevented from increasing beyond the maximum permissible voltage, and torque that can be produced during a high-speed operation can be increased and the maximum rotating speed can be increased.

The desired d-axis current is determined on the basis of the desired torque and the rotating speed. When a high torque is unnecessary during a high-speed operation, the d-axis current specified by the desired d-axis current can be reduced to prevent the undesirable increase of the d-axis current specified by the desired d-axis current. Thus the efficiency of the synchronous motor can be increased, heat generation by the synchronous motor can be suppressed and the power factor can be improved.

Preferably, the synchronous motor control method of the present invention determines the desired d-axis current so as to meet Expression (1) mentioned above. Thus the desired d-axis current can be decreased when the rotating speed is low and can be increased when the rotating speed is high. Thus the rate of change of the d-axis current specified by the desired d-axis current can, be changed according to the rotating speed and the d-axis current can be supplied so as to be effective in reducing the intensity of the magnetic field. The desired d-axis current can be decreased, the flow of an unnecessarily high d-axis current can be prevented and the efficiency can be improved when necessary torque is low by determining the desired q-axis current on the basis of the desired torque. The specified rotating speed may be nearly equal to a rotating speed of the synchronous motor at which a maximum torque can be produced when the terminal voltage is as high as the maximum permissible voltage. The specified rotating speed is determined on the basis of the characteristic of the synchronous motor and is specific to the synchronous motor. If the specified rotating speed cannot be accurately determined, a rotating speed nearly equal to the specified rotating speed may be used as the $\omega_{m1}$ of Expression (1).

Preferably, the synchronous motor control method according to the present invention decreases the d-axis current specified by the desired d-axis current to a field limiting current when a d-axis current specified by the desired d-axis current determined on the basis of the rotating speed of the synchronous motor and the desired torque is higher than a maximum field-weakening current. Thus the flow of a desired d-axis current exceeding the maximum field-weakening current can be prevented and it is possible to supply a current effective in reducing the intensity of the magnetic field created by the synchronous motor. Therefore, the flow of an unnecessarily high d-axis current exceeding the maximum field-weakening current through the synchronous motor can be prevented and the heat generation by the synchronous motor can be suppressed.

Preferably, the synchronous motor control method of the present invention determines the desired q-axis current and the desired d-axis current so that a current to be supplied to the synchronous motor may not exceed the maximum permissible current. Consequently, it is possible to prevent the burning of the synchronous motor due to dielectric breakdown resulting from the increase of the current flowing through the synchronous motor beyond the maximum permissible current. For example, the control of the synchronous motor can be facilitated and an intended control operation can be achieved by decreasing the q-axis current and the d-axis current without changing the ratio between the q-axis current specified by the desired q-axis current determined on the basis of the desired torque, and the d-axis current specified by the desired d-axis current determined on the basis of the rotating speed of the synchronous motor and the desired torque.

Preferably, the synchronous motor control method of the present invention changes the desired q-axis voltage according to the rotating speed. Consequently, the terminal voltage of the synchronous motor can be kept equal to or below the maximum permissible voltage even if parameters for determining the desired q-axis and the desired d-axis currents on the basis of the desired torque, such as induced voltage and the temperature-dependent resistance and reactance of the synchronous motor, are not correct. Thus the increase of the current flowing through the synchronous motor beyond the permissible current ran be equivalently prevented. The induced voltage that varies according to the rotating speed can be compensated by changing the desired q-axis voltage according to the rotating speed to prevent the increase of the voltage applied to the synchronous motor beyond the maximum permissible voltage and the increase of the current supplied to the synchronous motor beyond the maximum permissible current.

Preferably, the synchronous motor control method of the present invention calculates the compensating voltage by using Expression (2) mentioned above. Since the compensating voltage is proportional to the q-axis current specified by the desired q-axis current, it is possible to prevent the increase of the terminal voltage for the synchronous motor beyond the maximum permissible voltage without reducing the desired q-axis current according to the rotating speed. Since the compensating voltage is proportional to the d-axis current, the reduction of the field-weakening effect can be taken into consideration and it is possible to prevent the increase of the terminal voltage for the synchronous motor beyond the maximum permissible voltage. The terminal voltage for the synchronous motor can be decreased below the maximum permissible voltage by decreasing the desired q-axis voltage and the current flowing through the synchronous motor can be kept equal to or below the maximum permissible current.

The synchronous motor control system of the present invention has the arithmetic means that determines the q-axis and the d-axis currents on the basis of the measured rotating speed measured by the speed measuring means. The desired q-axis current is determined on the basis of the desired torque and the desired d-axis current is set to zero when the rotating speed of the synchronous motor is not higher than the specified rotating speed. When the rotating speed is higher than the specified rotating speed, the desired q-axis current is determined on the basis of the desired torque and the desired d-axis current is determined on the basis of the rotating speed of the synchronous motor and the desired torque. The field strength of the synchronous motor can be weakened and the decrease of the output torque of the synchronous motor can be suppressed by supplying the d-axis current specified by the desired d-axis current. Thus the output torque of the synchronous motor can be increased to the highest possible extent when the synchronous motor operates at a high rotating speed.

The desired d-axis current is determined on the basis of the toque command. When the synchronous motor operates at a high rotating speed and high torque is not necessary, the desired d-axis current can be decreased and the undesirable increase of the d-axis current can be prevented. Consequently, the efficiency of the synchronous motor can be improved, heat generation by the synchronous motor can be suppressed and the power factor can be improved. The specified rotating speed is dependent on the characteristic of the synchronous motor and is specific to the synchronous motor. If the specified rotating speed cannot be accurately determined, a value approximately equal to the specified rotating speed may be used.

DESCRIPTION OF THE PREFERRED EMBODIMENTS

Figure 1:
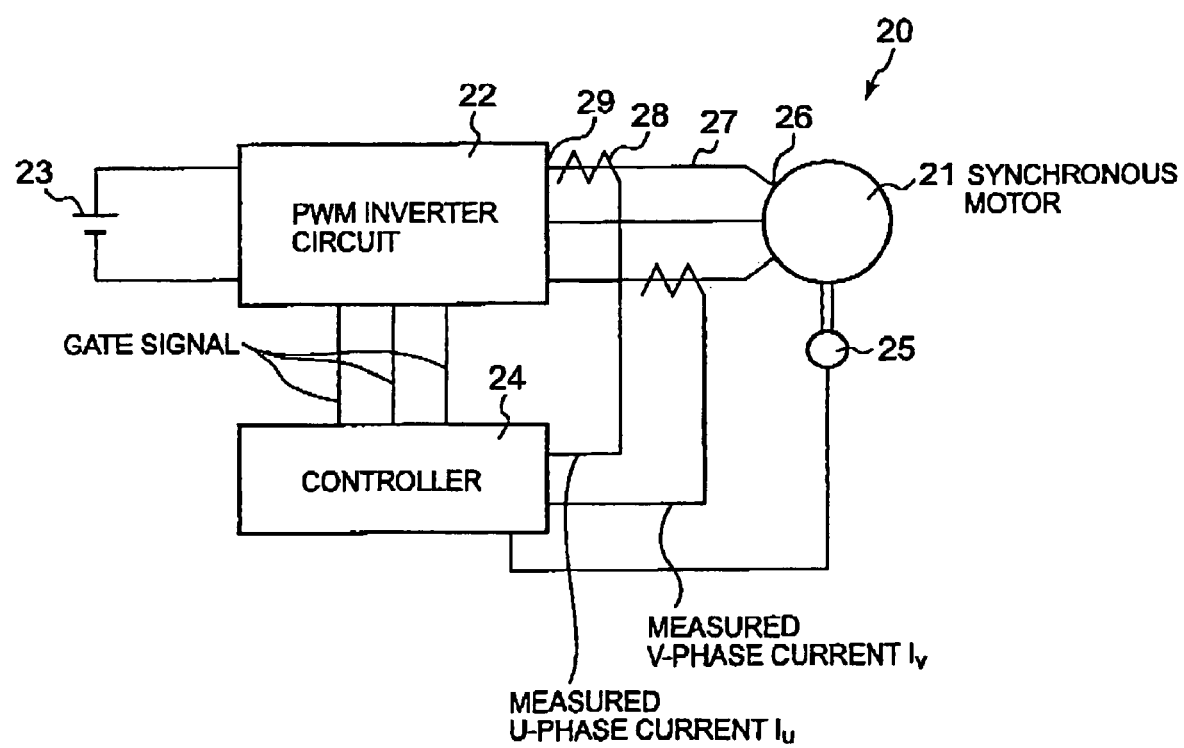
FIG. 1 is a block diagram of a synchronous motor control system in a first embodiment according to the present invention.

Referring to FIG. 1 showing a synchronous motor control system 20 in a first embodiment according to the present invention, the synchronous motor control system 20 includes a synchronous motor 21, a PWM inverter circuit 22, a dc power supply 23 and a controller 24. The synchronous motor 21 is a three-phase synchronous motor, such as a cylindrical brushless dc motor.

The inverter circuit 22 converts dc power provided by the dc power supply 23 into three-phase ac power and supplies the three-phase ac power to the synchronous motor 21. The inverter circuit 22 is provided with a plurality of switching devices for supplying ac currents to the three phases of the synchronous motor 21. The inverter circuit 22 has three output terminals 29 connected to three terminals 26 connected to the three phases of the synchronous motor 21 by connecting lines 27, respectively.

The controller 24 gives gate signals to the switching devices to make the inverter circuit 22 deliver sinusoidal ac currents differing in phase by 120° respectively to the connecting lines 27. The ac currents are supplied to the phases of the synchronous motor 21 through the connecting lines 27 to drive the rotor of the synchronous motor 21 for rotation. The controller 24 regulates the gate signals to be given to the inverter circuit 22 to regulate the rotating speed of the rotor of the synchronous motor 21 and the output torque of the synchronous motor 21.

The synchronous motor control system 20 is provided with two current measuring devices 28 respectively for measuring the currents flowing through the two of the three connecting lines 27. The current measuring devices 28 give current signals corresponding to measured currents to the controller 24. The synchronous motor 21 is provided with an angular position transducer 25 for measuring the angular position of the rotor thereof. The angular position transducer 25 sends an angular position signal corresponding to a measured angular position to the controller 24.

Figure 2:
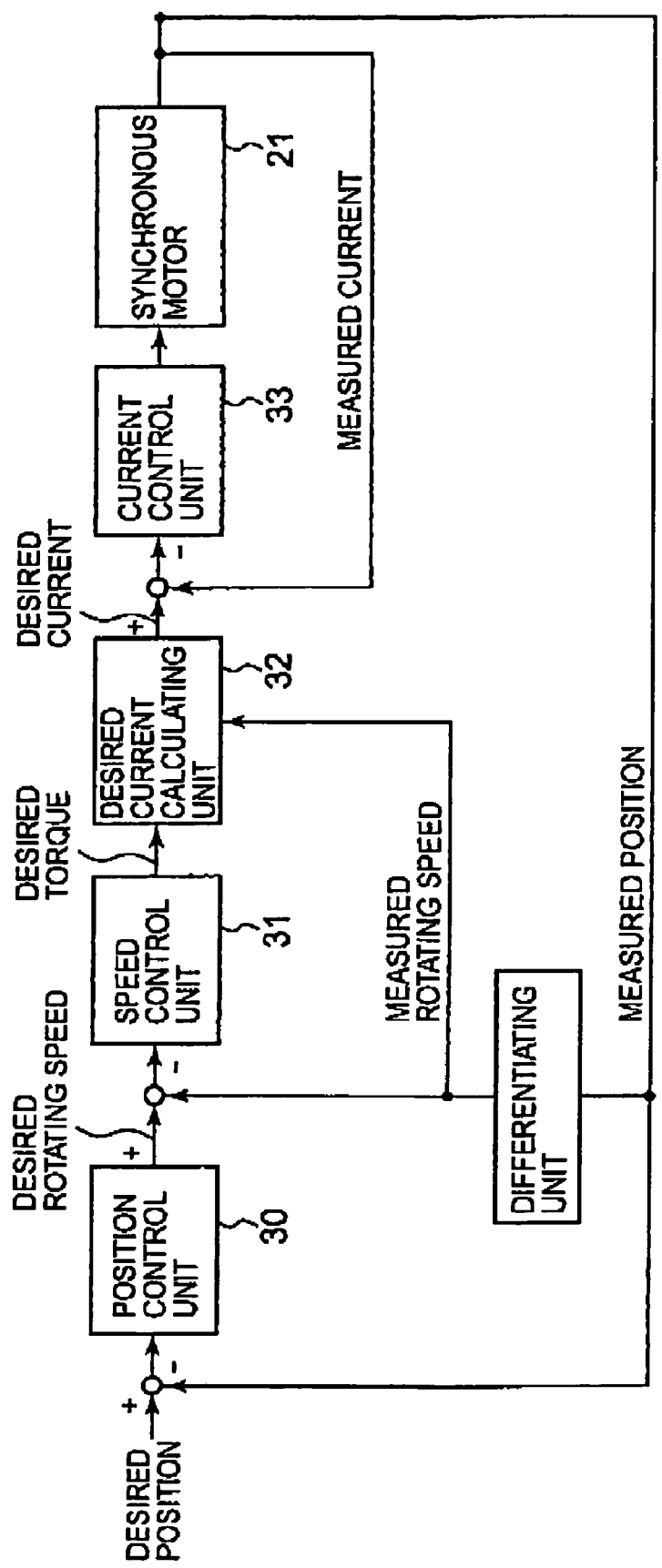
FIG. 2 is a block diagram of a control loop to be executed by a controller.

FIG. 2 is a block diagram of a control loop to be executed by the controller 24. The controller 24 receives an angular position signal corresponding to a measured angular position from the angular position transducer 25. The controller 24 receives current signals corresponding to measured currents from the current measuring devices 28. The controller 24 operates according to a previously stored program to execute the control loop. The following control loop may be realized by hardware, such as electric circuits.

The controller 24 subtracts a measure position data from a predetermined position data to determine a position deviation. A position control unit 30 multiplies the position deviation by a position gain for position loop control and calculates a desired speed. The controller 24 differentiates the measured position to calculate a measured speed. The controller 24 subtracts the measured speed from the desired speed calculated by the position control unit 30 to calculate a speed deviation.

Then, a speed control unit 31 included in the controller 24 performs speed loop control, such as proportional and integral control, with respect to the speed deviation to calculate a desired torque. A desired torque signal representing the desired torque is converted into a desired current signal representing a desired current necessary for producing the desired torque. A desired current calculating unit 32 included in the controller 24 calculates a desired current from the desired torque and the measured rotating speed.

Then, the controller 24 subtracts the measured current from the desired current and a current control unit 33 executes a current loop control to determine desired voltages for the phases. The desired voltages are converted into gate signals for the inverter circuit 22 and the gate signals are given to the inverter circuit 22. The inverter circuit 22 controls the synchronous motor 21.

The synchronous motor control system 20 subjects the currents flowing through the phases of the synchronous motor 21 to three-phase/dc-ac transformation, namely, d-q-axis transformation. Controlled variables are determined through the transformation of a q-axis current, namely, a torque component, and a d-axis current, namely, an exciting component, flowing through the synchronous motor 21 on a two-phase dc coordinate system, the controlled variables are subjected to dc-ac/three-phase transformation, namely, inverse d-q-axis transformation, to obtain desired voltages for the three phases. The synchronous motor 21 is controlled on the basis of the desired voltages for the three phases.

Figure 3:
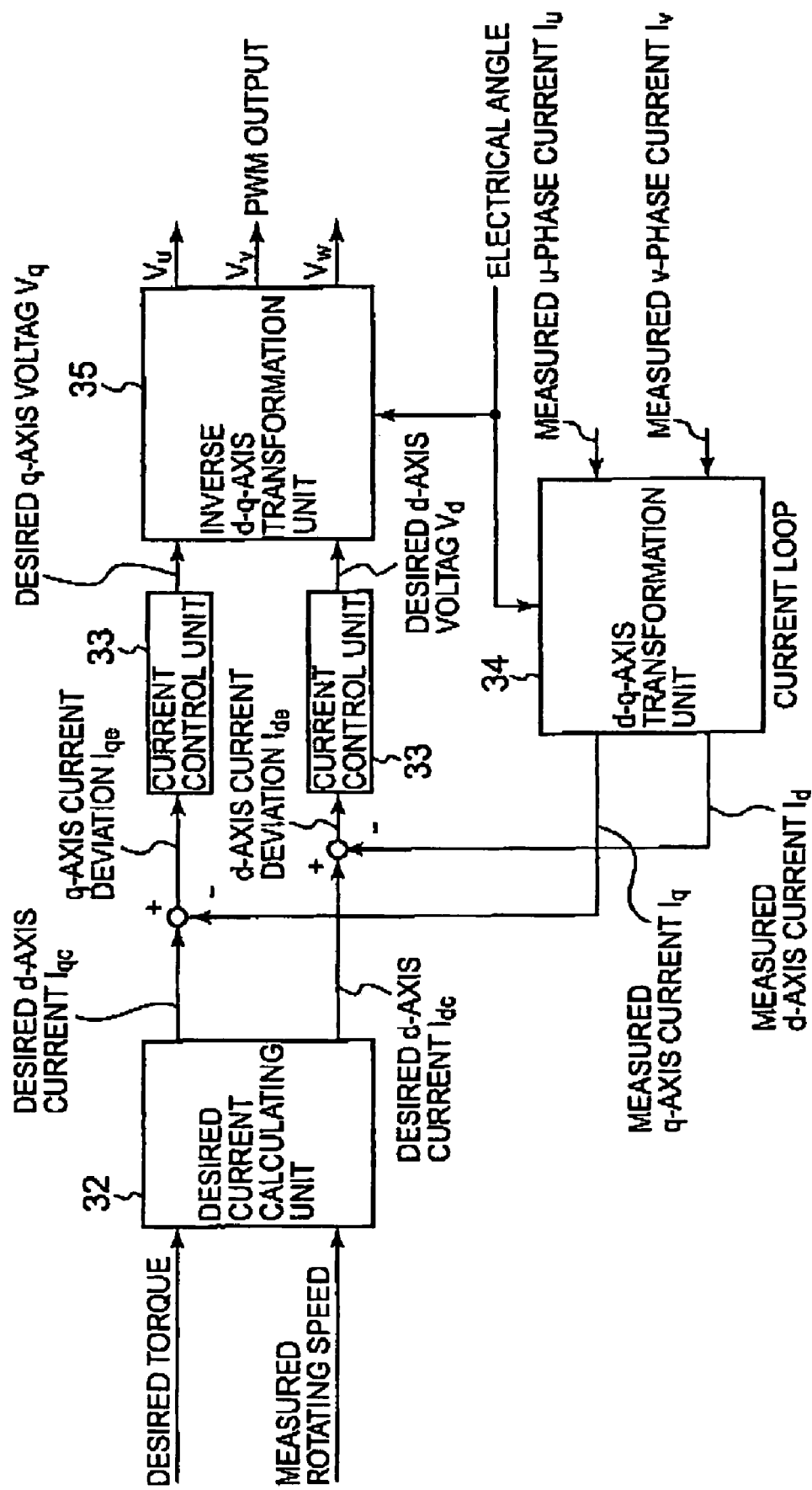
FIG. 3 is a block diagram of a desired current calculating unit and a current control unit.

FIG. 3 is a block diagram of the desired current calculating unit 32 and the current control unit 33. Current signals representing measured currents $I_u$ and $I_v$ flowing through the U- and the V-phases of the synchronous motor 21 among the U-, the V- and the W-phases of the synchronous motor 21 is given to the controller 24. A d-q-axis transformation unit 34 included in the controller 24 converts the measured currents $I_u$ and $I_v$ into a measured q-axis current $I_q$, namely, a torque current, and a measured d-axis current, namely, an exciting component, respectively, on the basis of electrical angle.

The desired current calculating unit 32 determines a desired q-axis current $I_{qc}$, namely, a torque component current, and a desired d-axis current $I_{dc}$, namely, an exciting component current, of a current to be supplied to the synchronous motor 21 on the basis of a specified torque and a measured rotating speed. Then, the controller 24 subtracts the measured q-axis current $I_q$ and the measured d-axis current $I_d$ respectively from the desired currents $I_{qc}$ and $I_{dc}$ to calculate current deviations $I_{qe}$ and $I_{de}$.

The current control unit 33 of the controller 24 calculates a desired q-axis voltage $V_q$ and a desired d-axis voltage $V_d$ necessary for producing currents respectively corresponding to the current deviations $I_{qe}$ and $I_{de}$. An inverse d-q-axis transformation unit 35 included in the controller 24 provides desired three-phase voltages $V_u$, $V_v$ and $V_w$ to be applied to the three phases of the synchronous motor 21 through d-q inverse transformation on the basis of the desired q-axis voltage $V_q$ and the desired d-axis voltage $V_d$ and electrical angle. The controller 24 gives gate signals for generating the desired three-phase voltages $V_u$, $V_v$ and $V_w$ to the inverter circuit 22. The inverter circuit 22 turns on and off the switching devices according to the gate signals to supply necessary currents to the phases of the synchronous motor 21.

The measured q-axis current $I_q$ and the measured d-axis current $I_d$ for the d-q-axis transformation are expressed by the following expressions.

$$I_d = A \cdot I_u + B \cdot I_v$$

$$I_q = C \cdot I_u + D \cdot I_v$$

$$A = (\tfrac{2}{3})\{\cos\theta_e - \cos(\theta_e - 240°)\}$$

$$B = (\tfrac{2}{3})\{\cos(\theta_e - 120°) - \cos(\theta_e - 240°)\}$$

$$C = (\tfrac{2}{3})\{\sin\theta_e - \sin(\theta_e - 240°)\}$$

$$D = (\tfrac{2}{3})\{\sin(\theta_e - 120°) - \sin(\theta_e - 240°)\}$$

where $I_d$ is a measured d-axis current, $I_q$ is a measured q-axis current, $I_u$ is a measured current measured by one of the current measuring devices 28, $I_v$ is a measured current measured by the other current measuring device 28, cos indicates the cosine, sin indicates the sine, and $\theta_e$ is an electrical angle on a d-q-axis coordinate system.

The desired three-phase voltages $V_u$, $V_v$ and $V_w$ for the inverse d-q-axis transformation are expressed by the following expressions.

$$V_u = V_d \cdot \cos\theta_e + V_q \cdot \sin\theta_e$$

$$V_v = V_d \cdot \cos(\theta_e - 120°) + V_q \cdot \sin(\theta_e - 120°)$$

$$V_w = -V_u - V_v$$

where $V_u$ is a first desired voltage, $V_v$ is a second desired voltage, $V_w$ is a third desired voltage, $V_d$ is a desired d-axis voltage and $V_q$ is a desired q-axis voltage.

Figure 4:
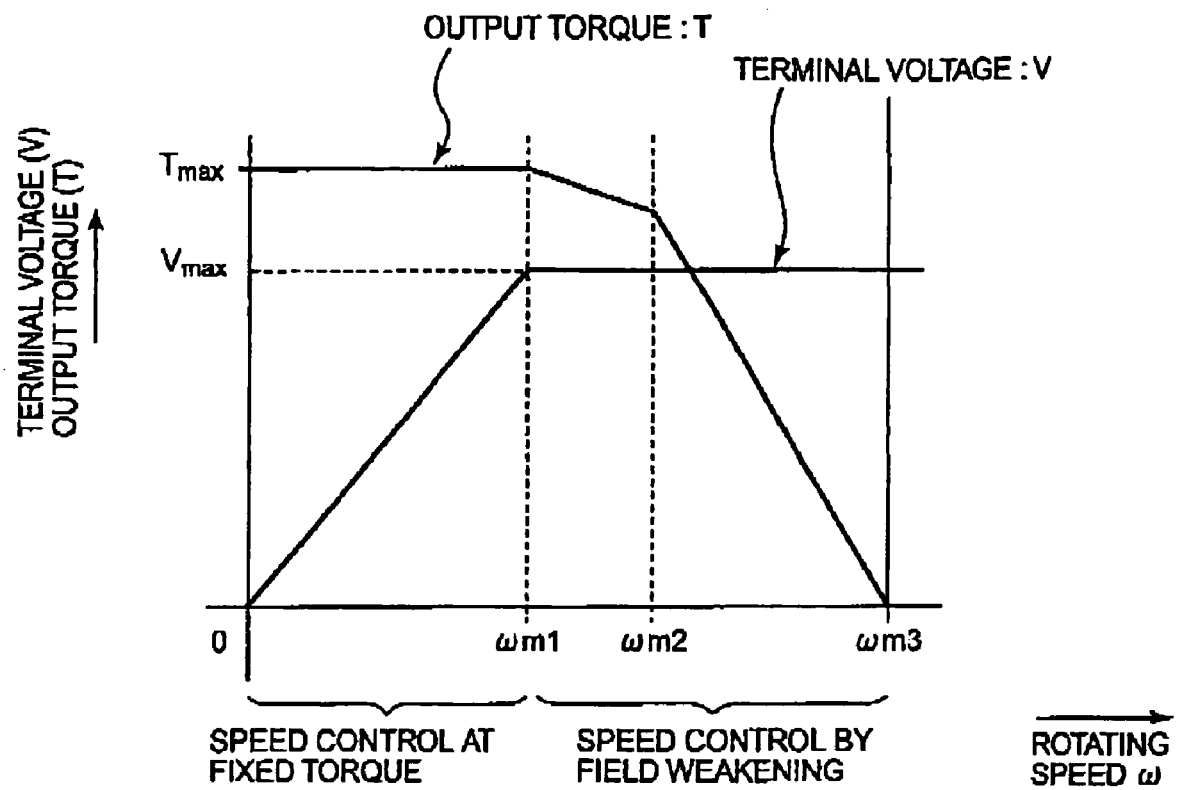
FIG. 4 is a graph showing the respective variations of terminal voltage applied to a synchronous motor and maximum output torque that can be produced by the synchronous motor with the rotating speed of the rotor of the synchronous motor.
Figure 5:
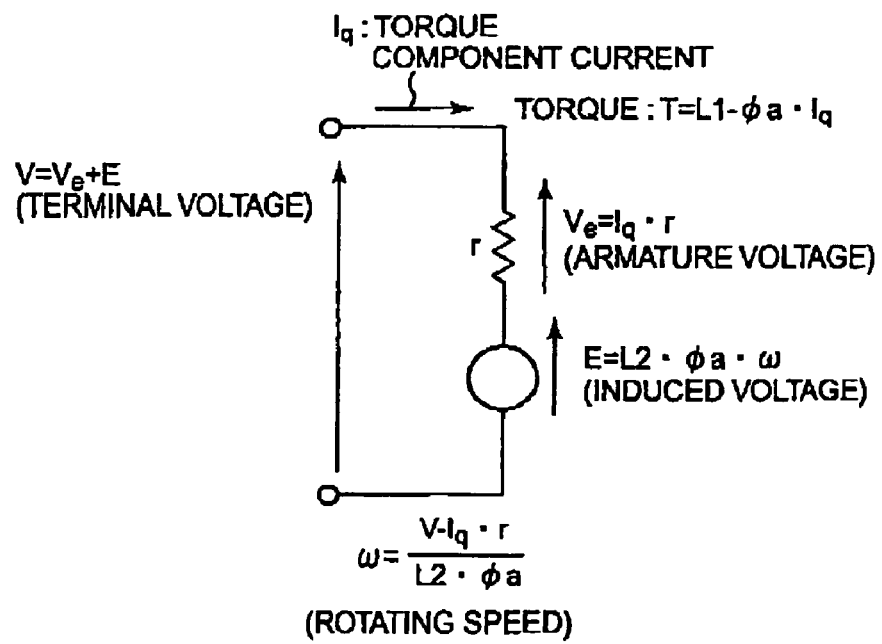
FIG. 5 is a circuit diagram of assistance in explaining terminal voltage for the synchronous motor.

FIG. 4 is a graph showing the respective variations of terminal voltage V applied to the synchronous motor 21 and maximum output torque T that can be produced by the synchronous motor 21 with the rotating speed of the rotor of the synchronous motor 21. FIG. 5 is a circuit diagram of assistance in explaining terminal voltage for the synchronous motor 21.

The rotating speed $\omega$ of the rotor of the synchronous motor 21 increases from zero in proportion to the increase of the terminal voltage V. The rotating speed $\omega$ is expressed by the following expression. For example, the rotating speed $\omega$ of the rotor of the synchronous motor 21 is expressed as a function of electrical angular velocity.

$$\omega = (V - I_q \cdot r)/(L_2 \cdot \phi_a) \quad (3)$$

where $\omega$ is rotating speed, V is terminal voltage, r is the resistance of the armature winding of the synchronous motor 21, $I_q$ is measured q-axis current, $L_2$ is a predetermined constant, and $\phi_a$ is the magnetic flux of the field called, in some cases, induced voltage constant or torque constant.

Suppose that a rotating speed at which a maximum torque $T_{max}$ can be produced when the terminal voltage V coincides with a maximum permissible voltage $V_{max}$ is a specified rotating speed $\omega_{m1}$. The specified rotating speed $\omega_{m1}$ is dependent on the characteristic of the synchronous motor 21 and is specific to the synchronous motor 21. If it is desired to rotate the rotor at a rotating speed not lower than the specified rotating speed $\omega_{m1}$, the terminal voltage V cannot be increased beyond the maximum permissible voltage $V_{max}$.

The terminal voltage V is equal to the sum of an armature voltage $V_e$ and an induced voltage E produced by speed electromotive force. The induced voltage E is produced by speed electromotive force and increases with the increase of the rotating speed $\omega$ of the rotor of the synchronous motor 21. When the terminal voltage V is fixed, the armature voltage $V_e$ decreases when the induced voltage E increases. The terminal voltage V, the armature voltage $V_e$ and the induced voltage E are expressed by Expressions (4), (5) and (6).

$$V = V_e + E \quad (4)$$

$$V_e = I_q \cdot r \quad (5)$$

$$E = L_2 \cdot \phi_a \cdot \omega \quad (6)$$

where V is the terminal voltage, $V_e$ is the armature voltage, E is the induced voltage, and $L_2$ is a predetermined constant.

If the rotating speed $\omega$ is increased beyond the specified rotating speed $\omega_{m1}$, the induced voltage E increases accordingly. Since the terminal voltage V cannot be increased beyond a maximum terminal voltage $V_{max}$, the armature voltage $V_e$ decreases as the induced voltage E increases and the q-axis current $I_q$ as the torque component current decreases accordingly. The output torque of the synchronous motor 21 is expressed by Expression (7).

$$T = L_1 \cdot \phi_a \cdot I_q \quad (7)$$

where T is the output torque of the synchronous motor 21, and $L_1$ is a predetermined constant. The output torque T decreases as the q-axis current Iq decreases. As shown in FIG. 4, a maximum output torque that can be produced by the synchronous motor 21 decreases after the rotating speed $\omega$ of the rotor of the motor 21 has exceeded the specified rotating speed $\omega_{m1}$.

The d-axis current $I_d$, namely, the exciting component current, is supplied to the synchronous motor 21 to increase the rotating speed $\omega$ further after the rotating speed $\omega$ has exceeded the specified rotating speed $\omega_{m1}$. Consequently, the magnetic flux $\phi_a$ can be equivalently reduced. As shown in Expressions (4) and (6), the increase of the induced voltage E resulting from the increase of the rotating speed $\omega$ can be suppressed and the decrease of the armature voltage $V_e$ is suppressed by reducing the magnetic flux $\phi_a$. As obvious from Expressions (5) and (7), the reduction of the output torque can be prevented and the rotating speed $\omega$ can be increased by suppressing the decrease of the q-axis current $I_q$.

As obvious from Expression (7), the torque T decreases even if the magnetic flux $\phi_a$ is equivalently reduced by supplying the d-axis current $I_d$ to the synchronous motor 21. A torque T produced when the d-axis current $I_d$ is supplied is higher than a torque T produced when the d-axis current $I_e$ is not supplied for the same rotating speed $\omega$. The maximum rotating speed can be raised by supplying the d-axis current $I_d$. The magnetic flux reducing effect of the d-axis current $I_d$ on reducing the magnetic flux $\phi_a$ is limited; the magnetic flux reducing effect of the d-axis current $I_d$ increases to a maximum when the d-axis current $I_d$ coincides with a predetermined maximum field-weakening current $I_{dmax}$; that is, the magnetic flux reducing effect of the d-axis current $I_d$ does not increase any further even if the d-axis current $I_d$ is increased beyond the predetermined maximum field-weakening current $I_{dmax}$.

The synchronous motor control method in this embodiment supplies the d-axis current $I_d$ to weaken the magnetic flux $\phi_a$ of the synchronous motor 21 to increase the maximum output torque T to the highest possible extent even if the rotating speed $\omega$ is not lower than the specified rotating speed $\omega_{m1}$. More specifically, the desired q-axis current $I_{qc}$ is determined on the basis of a desired torque necessary for rotating the rotor of the synchronous motor 21 at a desired rotating speed and the desired d-axis current $I_{dc}$ is set to zero until the rotating speed $\omega$ increases to the specified rotating speed $\omega_{m1}$.

When a desired rotating speed higher than the specified rotating speed $\omega_{m1}$ is specified after the terminal voltage V of the synchronous motor 21 has increased to the predetermined maximum permissible voltage $V_{max}$, the desired q-axis current $I_{qc}$ is determined on the basis of a desired torque, and the desired d-axis current $I_{dc}$ to be supplied to the synchronous motor 21 is determined on the basis of the rotating speed $\omega$ and the desired torque. The specified rotating speed $\omega_{m1}$ does not need to be an exact value and a rotating speed $\omega_{m1}'$ nearly equal to the specified rotation speed $\omega_{m1}$ may be used instead of the specified rotation speed $\omega_{m1}$. In the following description, the term "specified rotating speed $\omega_{m1}$ is used for designating any one of rotating speeds nearly equal to the specified rotation speed $\omega_{m1}$.

The synchronous motor control system 20 in the first embodiment will be described in detail. Referring to FIG. 3, the desired current calculating unit 32 determines the desired q-axis current $I_{qc}$ and the desired d-axis current $I_{dc}$. FIGS. 6 to 10 are graphs showing the desired q-axis current $I_{qc}$ and the desired d-axis current $I_{dc}$ determined by the desired current calculating unit 32.

Basically, the desired current calculating unit 32 determines the desired q-axis current $I_{qc}$ on the basis of a desired torque and determines the desired d-axis current $I_{dc}$ on the basis of a desired torque and the rotating speed $\omega$ by using predetermined arithmetic expressions like Expressions (8) and (9).

$$I_{dc1} = I_{qc1} \cdot \tan \theta_a \quad (8)$$

$$\theta_a = K_1 \cdot (\omega - \omega_{m1}) \quad (9)$$

where $I_{dc1}$ is a first desired q-axis current corresponds to a desired torque, $I_{qc1}$ is a first desired d-axis current determined on the basis of a desired torque and the rotating speed ω, tan is tangent of trigonometry, $K_1$ is a predetermined constant or a variable, ω is the measured rotating speed, $ω_{m1}$ is the specified rotating speed, and $θ_a$ is a parameter of the rotating speed ω. As mentioned above, the rotating speed $ω_{m1}'$ nearly equal to the specified rotation speed $ω_{m1}$ may be used as the specified rotation speed $ω_{m1}$. When $K_1>0$ and $ω<ω_{m1}$, $θ_a=0$. Table 1 shows the numerical values of those parameters.

TABLE 1

| Rated output | 4.2 kW |
|---|---|
| Rated torque | 16.7 N · m |
| Rated rotating speed | 2400 rpm |
| Rated current | 20 A |
| Rotor inertia | 58 × 10⁴ kg · m² |
| Phase resistance | 0.035 Ω |
| Phase inductance | 0.9 mH |

When the synchronous motor 21 has a characteristic specified by values shown in Table 1, the constant $K_1$ in Expression (9) is 75×10⁻³, and the specified rotating speed $ω_{m1}$ is 157.08 rad/s in electrical angle or about 1500 rpm in the rotating speed of the rotor.

Figure 6:
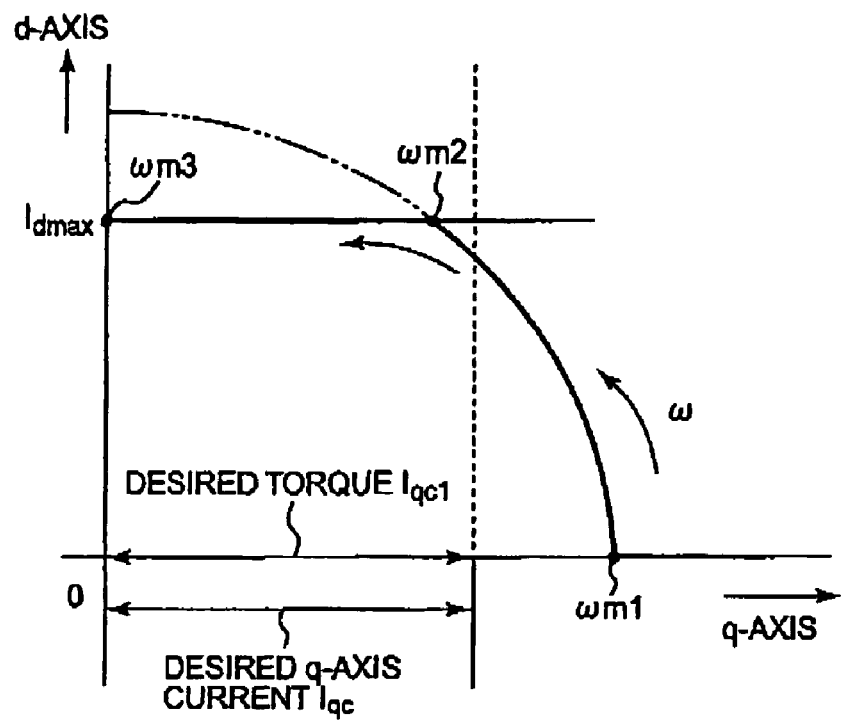
FIG. 6 is a graph showing desired q- and d-axis currents determined by the desired current calculating unit.

FIG. 6 shows the desired q-axis current $I_{qc}$ and the desired d-axis current $I_{dc}$ when the rotating speed ω is not higher than the specified rotating speed $ω_{m1}$. As shown in FIG. 6, the desired q-axis current $I_{qc}$ is equal to a first desired q-axis current $I_{qc1}$ corresponding to the desired torque when the rotating speed ω is not higher than the specified rotating speed $ω_{m1}$. The desired d-axis current $I_{dc}$ is always not lower than zero regardless of the rotating direction of the rotor of the synchronous motor 21 and the direction of the torque. The desired d-axis current $I_{dc}$ is zero.

Figure 7:
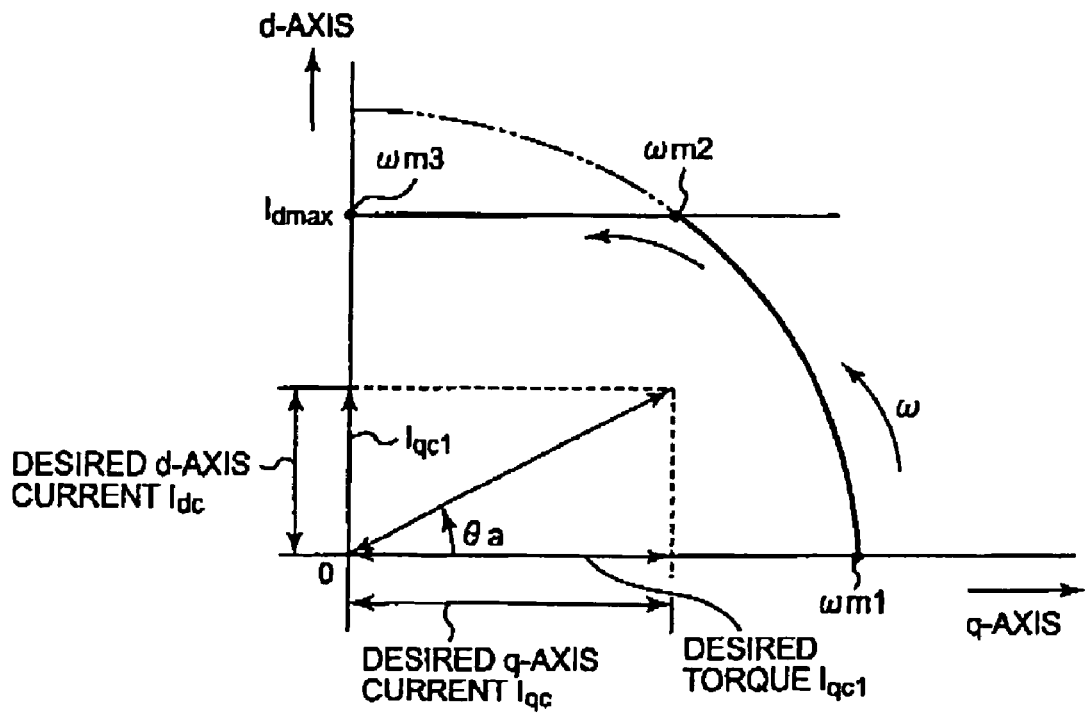
FIG. 7 is a graph showing desired q- and d-axis currents determined by the desired current calculating unit.

FIG. 7 shows the desired q-axis current $I_{qc}$ and the desired d-axis current $I_{dc}$ when the rotating speed ω is higher than the specified rotating speed $ω_{m1}$. As shown in FIG. 7, the desired q-axis current $I_{qc}$ is equal to a first desired q-axis current $I_{qc1}$ corresponding to the desired torque when the rotating speed ω is higher than the specified rotating speed $ω_{m1}$. The desired d-axis current $I_{dc}$ is equal to a first desired d-axis current $I_{dc1}$ calculated by using Expression (8).

Figure 8:
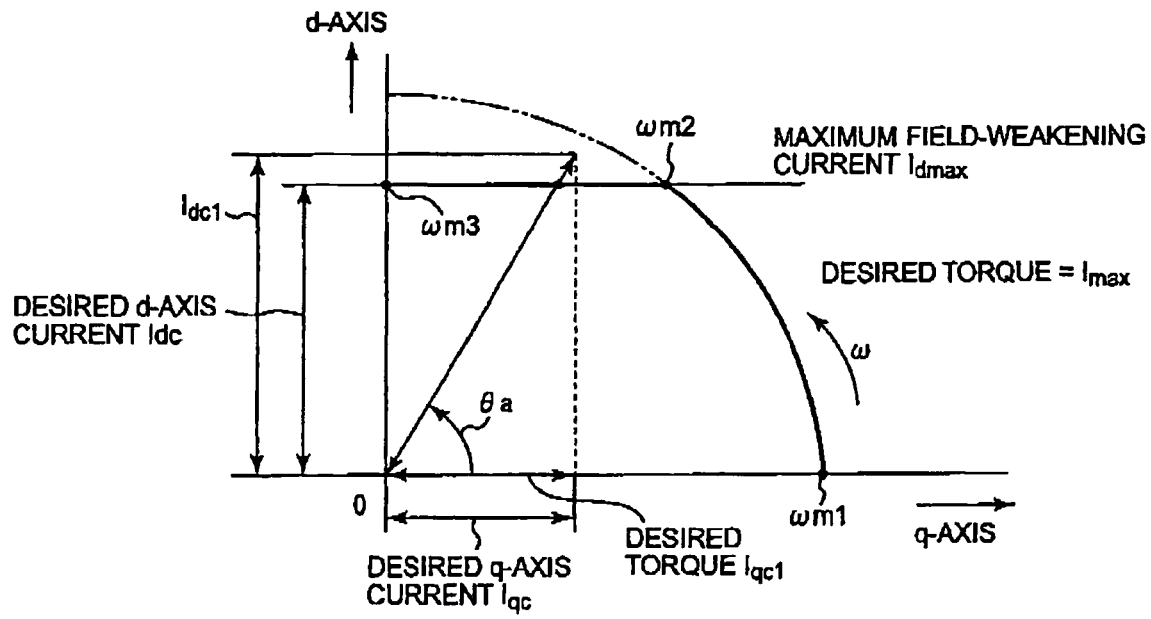
FIG. 8 is a graph showing desired q- and d-axis currents determined by the desired current calculating unit.

FIG. 8 shows the desired q-axis current $I_{qc}$ and the desired d-axis current $I_{dc}$ when the first desired d-axis current $I_{dc1}$ is higher than the maximum field-weakening current $I_{dmax}$. As shown in FIG. 8, the desired current calculating unit 32 selects the maximum field-weakening current $I_{dmax}$ as the desired d-axis current $I_{dc}$ when the first desired d-axis current $I_{dc1}$ is higher than the maximum field-weakening current $I_{dmax}$. For example, when the synchronous motor 21 has a characteristic specified by values shown in Table 1, the maximum field-weakening current $I_{dmax}$ is 56 A.

Figure 9:
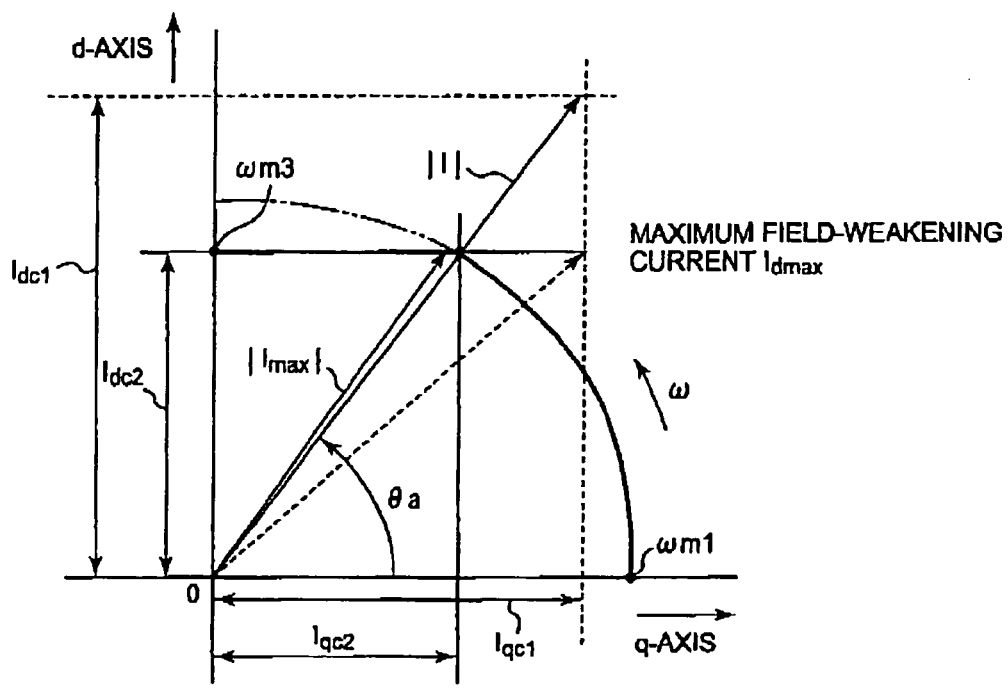
FIG. 9 is a graph showing desired q- and d-axis currents determined by the desired current calculating unit.
Figure 10:
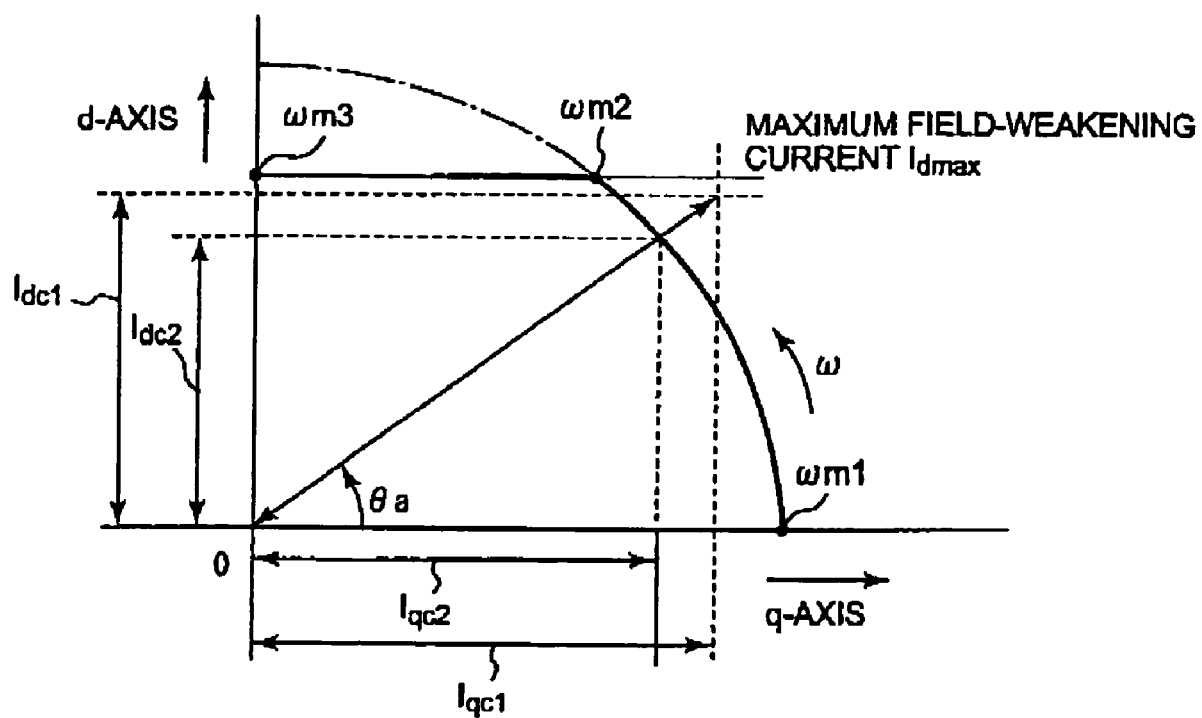
FIG. 10 is a graph showing desired q- and d-axis currents determined by the desired current calculating unit.

FIGS. 9 and 10 show a condition where a current |I| that flows through the synchronous motor 21 exceeds the maximum permissible current $|I_{max}|$ when a current is supplied to the synchronous motor 21 on the basis of the first desired q-axis current $I_{qc1}$ and the first desired d-axis current $I_{dc1}$. A second desired q-axis current $I_{qc2}$ and a second desired d-axis current $I_{dc2}$ are determined so that the current flowing through the synchronous motor 21 is not higher than the maximum permissible current when a current |I| that flows through the synchronous motor 21 exceeds the maximum permissible current $|I_{max}|$ and Expression (10) is satisfied if the first desired q-axis current $I_{qc1}$ and the first desired d-axis current $I_{dc1}$ are supplied to the synchronous motor 21.

$$|I_{max}|<(I_{dc1}^2+I_{qc1}^2)^{0.5} \quad (10)$$

More specifically, the second desired q-axis current $I_{qc2}$ and the second desired d-axis current $I_{dc2}$ are determined so as to meet Expressions (11) and (12) and the second desired q-axis current $I_{qc2}$ and the second desired d-axis current $I_{dc2}$ are used instead of the first desired q-axis current $I_{qc1}$ and the first desired d-axis current $I_{dc1}$.

$$|I_{max}|=(I_{dc2}^2+I_{qc2}^2)^{0.5} \quad (11)$$

$$I_{dc2}=I_{qc2}·\tan θ_a \quad (12)$$

Even if the first desired q-axis current $I_{qc1}$ is determined on the basis of the desired torque and the desired d-axis current $I_{dc}$ is used as the maximum field-weakening current $I_{dmax}$ according to the rotating speed ω, the second desired q-axis current $I_{qc2}$ and the second desired d-axis current $I_{dc2}$ meeting Expressions (11) and (12) are used as the desired q-axis current $I_{qc}$ and the desired d-axis current $I_{dc}$ when Expression (10) is not satisfied (FIG. 9). Similarly, even if the first desired q-axis current $I_{qc1}$ is determined on the basis of the desired torque and the first desired d-axis current $I_{dc1}$ is determined by using Expression (8), the second desired q-axis current $I_{qc2}$ and the second desired d-axis current $I_{dc2}$ meeting Expressions (11) and (12) are used as the desired q-axis current $I_{qc}$ and the desired d-axis current $I_{dc}$ when Expression (10) is not satisfied (FIG. 10). Basically, the synchronous motor control system in the first embodiment uses the desired torque as the desired q-axis current $I_{qc}$, increases the desired d-axis current $I_{dc}$ according to the increase of the desired q-axis current $I_{qc}$ and the rotating speed ω, and keeps the current |I| flowing through the synchronous motor 21 below the maximum permissible current $|I_{max}|$.

The synchronous motor control system in the first embodiment determines the desired q-axis current $I_{qc}$ on the basis of the desired torque until the terminal voltage V of the synchronous motor 21 increases to the maximum permissible voltage $V_{max}$, that is, until the rotating speed ω increases to the specified rotating speed $ω_{m1}$. Under such a condition, the efficiency can be improved, the heat generation of the synchronous motor 21 can be suppressed and the power factor can be improved by reducing the desired d-axis current $I_{dc}$ to zero. A desired output torque can be produced regardless of the increase of the induced voltage E by increasing the terminal voltage V until the terminal voltage V reaches the maximum permissible voltage $V_{max}$.

After the terminal voltage V has increased to the maximum permissible voltage $V_{max}$ and the rotating speed ω has exceeded the specified rotating speed $ω_{m1}$, the desired q-axis current $I_{qc}$ is determined according to the desired torque, and the desired d-axis current $I_{dc}$ is determined on the basis of the rotating speed ω and the desired torque. The magnetic flux $φ_a$ can be equivalently reduced and the reduction of the output torque of the synchronous motor 21 can be suppressed by supplying a current to the synchronous motor 21 on the basis of the thus determined desired d-axis current $I_{dc}$. Thus the maximum torque that can be produced by the synchronous motor 21 can be increased when the synchronous motor 21 operates at a high operating speed and the maximum rotating speed of the rotor of the synchronous motor 21 can be raised.

Basically, the desired d-axis current $I_d$ is determined on the basis of the desired torque as expressed by Expression (8). Therefore, the desired d-axis current $I_{dc}$ can be decreased and the undesired increase of the desired d-axis current $I_{dc}$ can be prevented when the rotor of the synchronous motor 21 rotates at a high rotating speed under a condition not requiring high torques. Thus the efficiency of the synchronous motor 21 can be improved, the heat generation of the synchronous motor 21 can be suppressed and the power factor can be improved.

The synchronous motor control system 20 in the first embodiment determines the desired d-axis current $I_{dc}$ on the basis of the rotating speed ω as expressed by Expression (8). Therefore, the desired d-axis current $I_{dc}$ can be reduced to an extent substantially equal to zero as shown in FIG. 6 when the rotating speed ω is low and can be raised as shown in FIG. 7 when the rotating speed ω is high. The rate of change of the desired d-axis current $I_{dc}$ can be changed according to the rotating speed ω by using Expression (8) including a tangent function, namely, a trigonometric function. Therefore, a d-axis current effective in reducing the magnetic flux $\phi_a$ can be supplied to the synchronous motor 21. When the desired d-axis current $I_{dc}$ is determined by using Expression (8) to produce a maximum torque corresponding to the rotating speed ω, the desired q-axis current $I_{qc}$ and the desired d-axis current $I_{dc}$ can be determined so that the current I supplied to the synchronous motor 21 is as nearly equal to the maximum permissible current $|I_{max}|$ as possible, and the maximum torque that can be produced by the synchronous motor 21 can be increased.

When the first desired d-axis current $I_{dc1}$ determined on the basis of the desired torque and the rotating speed ω is higher than the maximum field-weakening current $I_{dmax}$ as shown in FIG. 8, the desired d-axis current $I_{dc}$ is used as the maximum field-weakening current $I_{dmax}$. Consequently, the d-axis current does not exceeds the maximum field-weakening current $I_{dmax}$ and a current can be supplied to the synchronous motor 21 so as to be effective in weakening the magnetic flux $\phi_a$ produced in the synchronous motor 21 and the maximum torque that can be produced by the synchronous motor 21 can be increased.

The synchronous motor control system 20 in the first embodiment calculates the desired q-axis current $I_{qc}$ and the desired d-axis current $I_{dc}$ by using Expressions (11) and (12) so that the current flowing through the synchronous motor 21 may not exceed the maximum permissible current $I_{max}$. Thus the burning of the synchronous motor 21 due to dielectric breakdown can be prevented. The control of the synchronous motor 21 can be facilitated and an intended control operation can be achieved by determining the desired q-axis current $I_{qc}$ and the desired d-axis current $I_{dc}$ so that the current flowing through the synchronous motor 21 may not exceed the maximum permissible current $I_{max}$ without changing the ratio between the first desired q-axis current $I_{qc1}$ determined on the basis of the desired torque, and the first desired d-axis current $I_{dc1}$ determined on the basis of the rotating speed ω and the desired torque.

Figure 11:
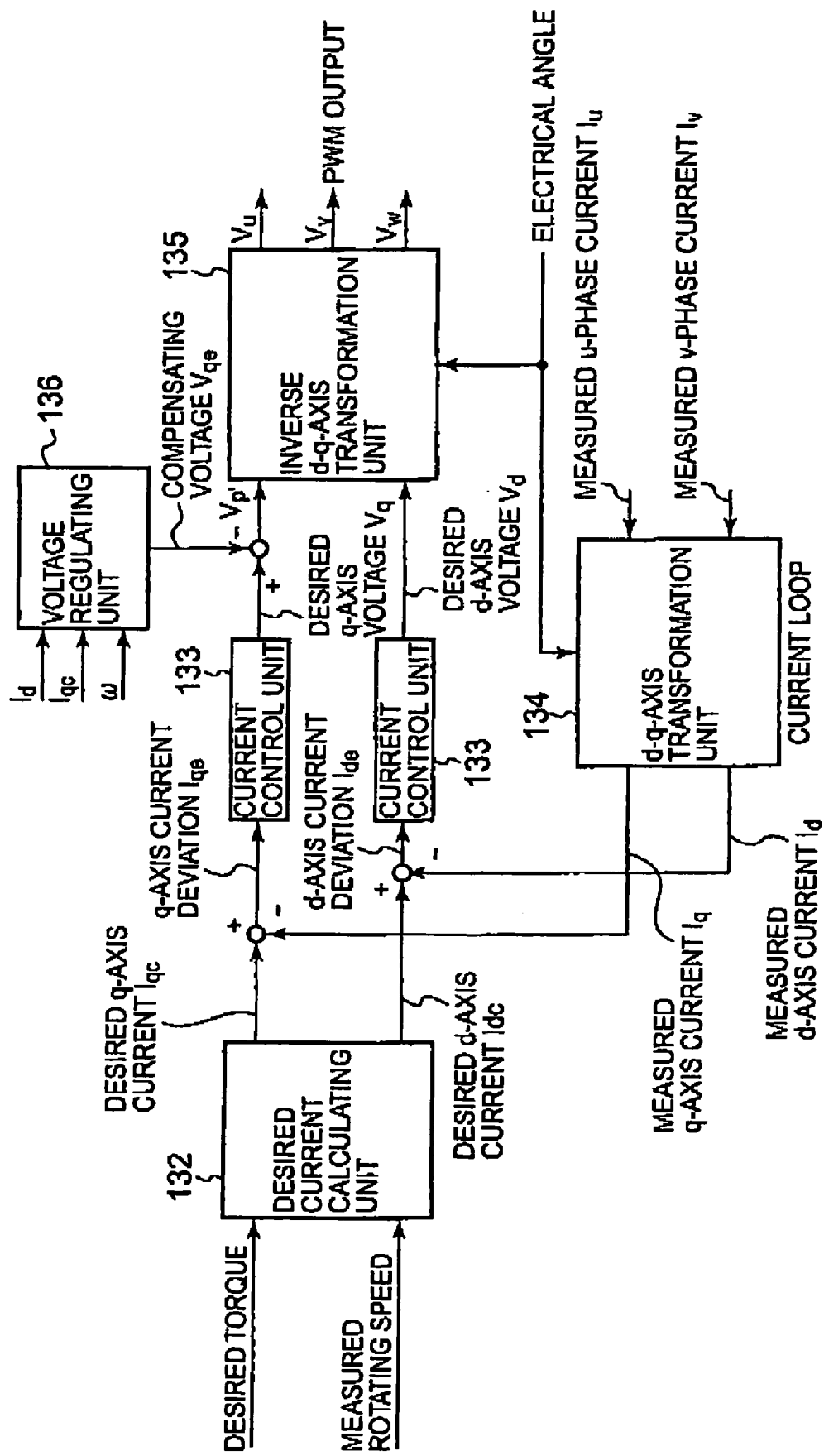
FIG. 11 is a block diagram of a desired current calculating unit and a current control unit included in a synchronous motor control system in a second embodiment according to the present invention.

FIG. 11 is a block diagram of a desired current calculating unit 132 and a current control unit 133 included in a synchronous motor control system in a second embodiment according to the present invention. The synchronous motor control system in the second embodiment is similar in configuration to the synchronous motor control system 20 for carrying out the synchronous motor control system 20 in the first embodiment, except that the operation of the desired current calculating unit 132 is different from that of the desired current calculating unit 32 of the synchronous motor control system 20 and the synchronous motor control system in the second embodiment is additionally provided with a desired q-axis voltage regulating unit 136 for regulating a desired q-axis voltage $V_q$. Description of the components and functions of the synchronous motor control system in the second embodiment similar to those of the synchronous motor control system in the first embodiment will be omitted.

The desired current calculating unit 132 uses a given desired torque as a first desired q-axis current $I_{qc1}$. Basically, the synchronous motor control system in the second embodiment calculates a desired d-axis current $I_{dc}$ by using Expression (8) and uses a first desired q-axis current $I_{qc1}$ and a first desired d-axis current $I_{dc1}$ as a desired q-axis current $I_{qc}$ and a desired d-axis current $I_{dc}$.

A d-axis current $I_d$ exceeding a maximum field-weakening current having a maximum effect on weakening a magnetic flux $\phi_a$ in a synchronous motor 21 does not have a field-weakening effect higher than that of the maximum field-weakening current. Therefore, if a desired first d-axis current $I_{dc1}$ calculated by using Expression (8) is higher than the maximum field-weakening current $I_{dmax}$, the maximum field-weakening current $I_{dmax}$ is used as a desired d-axis current $I_{dc}$.

If a current $|I|$, namely, the absolute value of a current I flowing through the synchronous motor 21 is higher than a predetermined maximum permissible current $|I_{max}|$ when a first desired q-axis current $I_{qc1}$ determined on the basis of a desired torque, and a first desired d-axis current $I_{dc1}$ determined on the basis of a rotating speed ω and the desired torque are supplied to the synchronous motor 21, i.e., when a condition expressed by Expression (10) is satisfied, a desired q-axis current $I_{qc}$ and a desired d-axis current $I_{dc}$ are determined so that the current $|I|$ flowing through the synchronous motor 21 is not higher than the maximum permissible current $|I_{max}|$. More specifically, a third desired d-axis current $I_{dc3}$ meeting Expression (13) is used as the desired d-axis current $I_{dc}$.

$$|I_{max}|=(I_{dc3}^2+I_{qc1}^2)^{0.5} \quad (13)$$

Thus the desired q-axis current determined on the basis of the desired torque is used and the third desired d-axis current $I_{dc3}$ calculated by using Expression (13) is used as the desired d-axis current $I_{dc}$.

A controller 24 gives a q-axis current deviation $I_{qe}$ obtained by subtracting a measured q-axis current from the desired q-axis current $I_{qc}$, and a d-axis current deviation $I_{de}$ obtained by subtracting a measured d-axis current from the desired q-axis current $I_{dc}$ to a current control unit 133 to determine a desired q-axis voltage $V_q$ and a desired d-axis voltage $V_d$. A voltage regulating unit 136 determines a compensating voltage $V_{qe}$ variable according to the rotating speed. The controller 24 gives an adjusted q-axis voltage $V_q'$ obtained by subtracting the compensating voltage $V_{qe}$ from the desired q-axis voltage $V_q$ to a d-q-axis inverse transformation unit 135; that is, a transformation expression uses the adjusted q-axis voltage $V_q'$ instead of the desired q-axis voltage $V_q$.

The voltage adjusting unit 136 determines the compensating voltage $V_{qe}$ on the basis of measured d-axis current $I_d$, desired q-axis current $I_{qc}$ and rotating speed ω by using Expression (14).

$$V_{qe}=K_2 \cdot \omega \cdot I_{qc}+K_3 \cdot \omega \cdot I_d \quad (14)$$

where $V_{qe}$ is compensating voltage, $K_2$ and $K_3$ are predetermined constants or variables, $I_{qc}$ is a desired q-axis current determined on the basis of a desired torque, and ω is a rotating speed.

Figure 12:
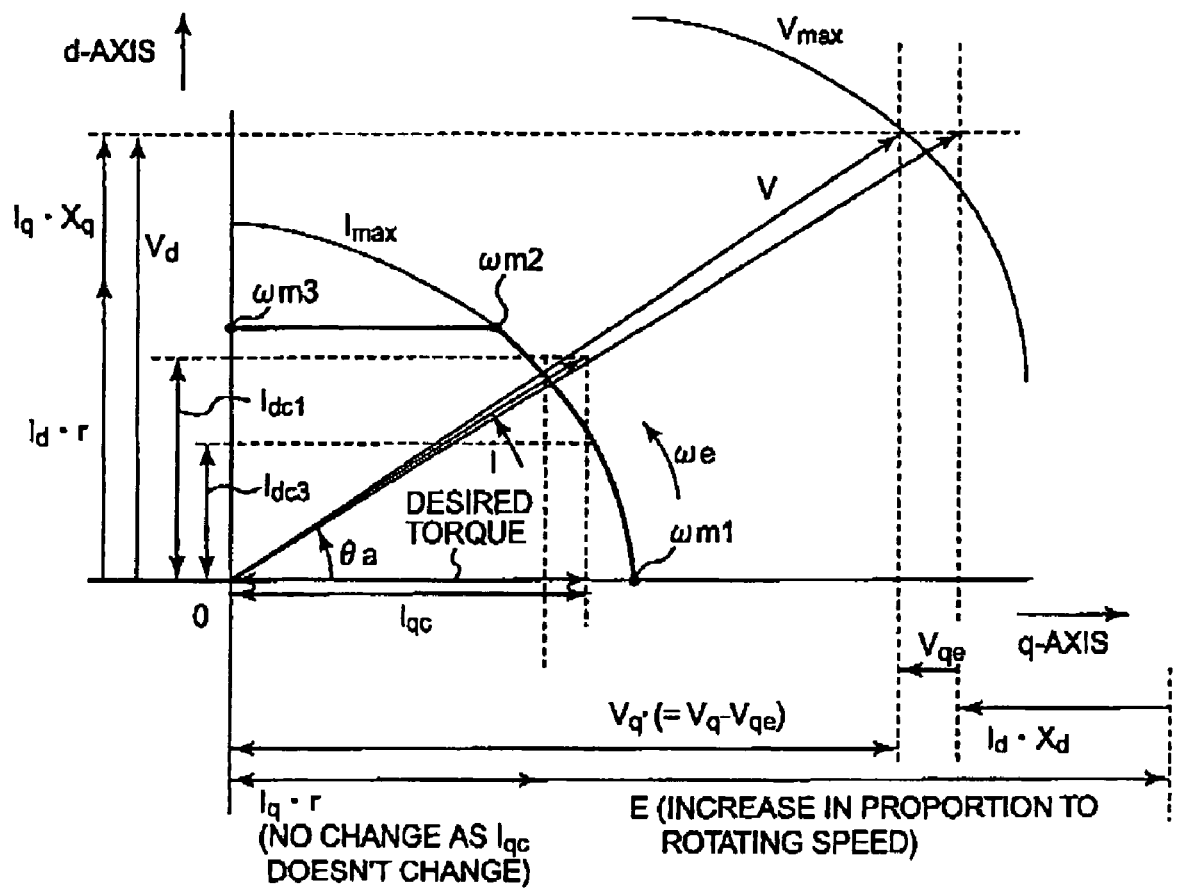
FIG. 12 is a graph showing the desired q- and d-axis currents, the desired q- and d-axis voltages and the compensating voltage used by the synchronous motor control system in the second embodiment.

FIG. 12 is a graph showing the q-axis current $I_{qc}$, the d-axis current $I_{dc}$, the desired q-axis voltage $V_q$ and the desired d-axis voltage $V_d$ and the compensating voltage $V_{qe}$ used by the synchronous motor control system in the second embodiment. As mentioned above, the desired q-axis current $I_{qc}$ is equal to the desired torque and is determined regardless of the rotating speed ω. Basically, the desired d-axis current is determined by using Expression (8) and is redetermined by using Expression (13) after the current |I| flowing through the synchronous motor 21 has increased to a maximum permissible current $|I_{max}|$.

When the synchronous motor 21 is thus controlled, there is a possibility that the terminal voltage V of the synchronous motor 21 exceeds a maximum permissible voltage $V_{max}$. Therefore, the synchronous motor control system in the second embodiment gives the adjusted q-axis voltage $V_q'$ obtained by subtracting the compensating voltage $V_{qe}$ from the desired q-axis voltage $V_q$ to the d-q-axis inverse transformation unit 135. Consequently, the terminal voltage V of the synchronous motor 21 can be prevented from increasing beyond the maximum permissible voltage $V_{max}$. The q-axis current can be equivalently reduced by reducing the q-axis voltage applied to the synchronous motor 21 to prevent the current flowing through the synchronous motor 21 from increasing beyond the maximum permissible current $|I_{max}|$.

The compensating voltage $V_{qe}$ serves for compensating for an induced voltage E increasing in proportion to the increase of the rotating speed ω. The terminal voltage V of the synchronous motor 21 is surely prevented from increasing beyond the maximum permissible voltage $V_{max}$ by increasing the compensating voltage $V_{qe}$ in proportion to the increase of the rotating speed ω.

The voltage applied to the synchronous motor 21 corresponding to the desired q-axis current $I_{qc}$ can be reduced because Expression (14) for calculating the compensating voltage $V_{qe}$ has the term "$K_2 \cdot \omega \cdot I_{qc}$", which is a function of the desired q-axis current $I_{qc}$. Whereas the synchronous motor control system in the first embodiment reduces the desired q-axis current $I_{qc}$ according to the rotating speed ω, the synchronous motor control system in the second embodiment can reduce the $I_q \cdot r$ (r is the resistance of the armature winding of the synchronous motor 21) by the adjusted q-axis voltage $V_q'$. Consequently, one of the causes making the terminal voltage V of the synchronous motor 21 increase beyond the maximum permissible voltage $V_{max}$ can be eliminated.

The term "$K_3 \cdot \omega \cdot I_d$" of Expression (14) for calculating the compensating voltage $V_{qe}$ is a function of the measured d-axis current $I_d$. Therefore, the voltage to be applied to the synchronous motor 21 can be changed according to the measured d-axis current $I_d$. Therefore, even if the measured d-axis current $I_d$ is lower than that used by the first embodiment and has a small field-weakening effect, the adjusted q-axis voltage can compensate for increasing $I_d \cdot X_d$ ($X_d$ is the d-axis reactance of the synchronous motor 21). Consequently, one of the causes making the terminal voltage V of the synchronous motor 21 increase beyond the maximum permissible voltage $V_{max}$ can be eliminated.

Figure 13:
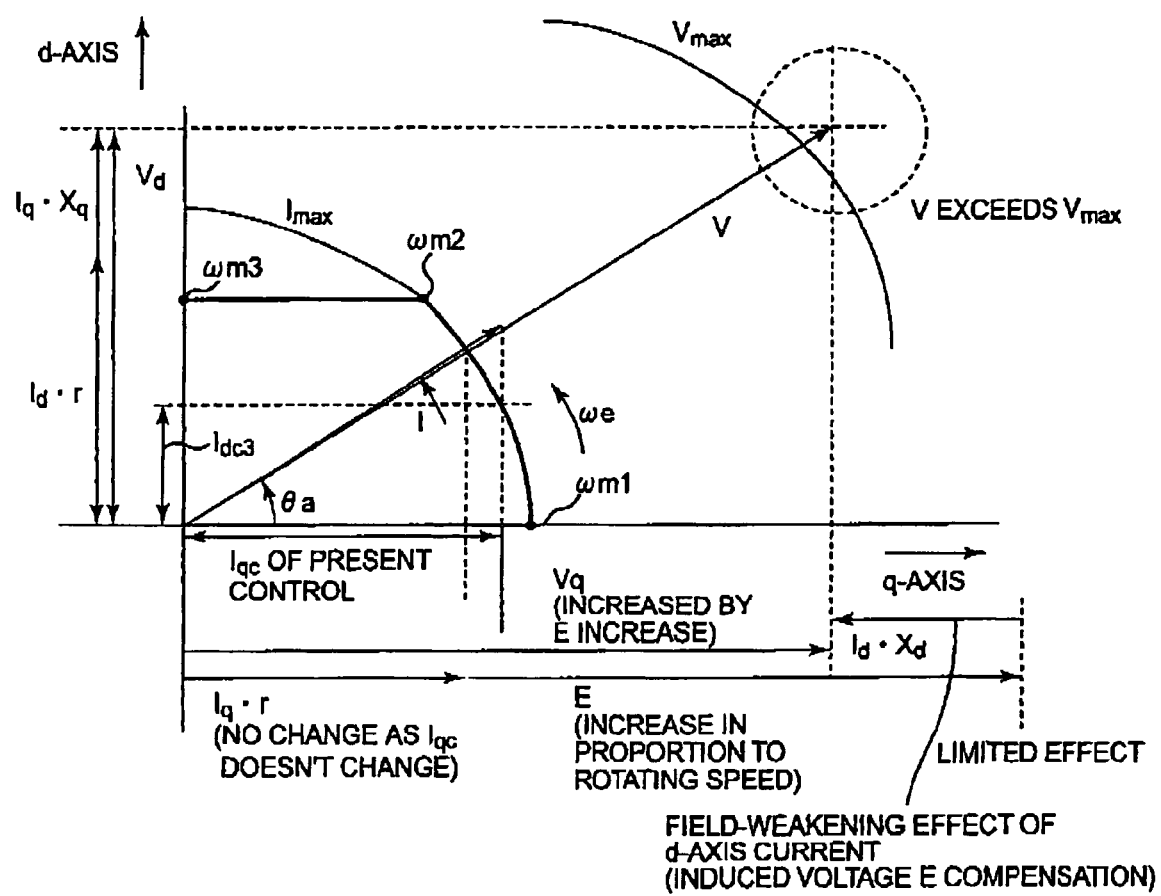
FIG. 13 is a graph showing desired q- and d-axis currents, desired q- and d-axis voltages and compensating voltage in a synchronous motor control system in a comparative example.

FIG. 13 is a graph showing a desired q-axis current $I_{qc}$, a desired d-axis current $I_{dc}$, a desired q-axis voltage $V_q$, a desired d-axis voltage $V_d$ and a compensating voltage $V_{q3}$ in a synchronous motor control system in a comparative example. In FIG. 13, the compensating voltage $V_{qe}$ is not set. The desired q-axis current $I_{qc}$ does not decrease according to the rotating speed ω and hence the desired d-axis current $I_{dc}$ is low when the compensating voltage $V_{qe}$ is not set. Consequently, the field-weakening effect is small and effect on lowering the induced voltage E is small. When the induced voltage E increases, the q-axis voltage $V_q$ increases accordingly. Consequently, the terminal voltage V increases and the terminal voltage V may possibly increase beyond the maximum permissible voltage $V_{max}$.

The synchronous motor control system in the second embodiment gives the adjusted q-axis voltage $V_q'$ obtained by subtracting the compensating voltage $V_{qe}$ from the desired q-axis voltage $V_q$ to the d-q-axis inverse transformation unit 135 as mentioned in connection with FIG. 12. Consequently, the terminal voltage V of the synchronous motor 21 can be prevented from increasing beyond the maximum permissible voltage $V_{max}$. In the second embodiment, the desired torque is used as the desired q-axis current $I_{qc}$, the desired d-axis current $I_{dc}$ is increased with the increase of the desired q-axis current $I_{qc}$ and the rotating speed ω, the current |I| flowing through the synchronous motor 21 is kept below the maximum permissible current $|I_{max}|$ and the adjusted q-axis voltage $V_q'$ obtained by subtracting the compensating voltage $V_{qe}$ from the desired q-axis voltage $V_q$ is given to the d-q-axis inverse transformation unit 135 and the compensating voltage $V_{qe}$ is increased with the increase of the measured d-axis current $I_d$, the desired q-axis current $I_{qc}$ and the rotating speed ω.

As apparent from the foregoing description, the effect of the synchronous motor control system in the second embodiment is the same as that of the synchronous motor control system in the first embodiment. The first embodiment needs to have an accurate grasp of the induced voltage E, and the reactances $X_d$ and $X_q$ and the resistance R of the synchronous motor 21. The values of those parameters E, $X_d$, $X_q$ and R change with temperature and the rotating speed ω and hence, in some cases, it is difficult to determine the values of those parameters E, $X_d$, $X_q$ and R accurately.

The second embodiment does not change the desired q-axis current and redetermines the desired d-axis current regardless of the electrical angle $\theta_a$ even in a state where the desired q- and d-axis currents calculated by using Expression (8) have increased beyond the maximum permissible current $I_{max}$. Therefore, even if the values of those parameters are not accurately determined, the terminal voltage V of the synchronous motor 21 and the current I flowing through the synchronous motor 21 can be kept below the maximum permissible voltage and the maximum permissible current, respectively, and the highest possible output torque can be produced while the synchronous motor 21 is operating at a high operating speed.

The controller 24 of each of the foregoing embodiments is only an example and various changes can be made therein without departing from the scope of the present invention. For example, any suitable rotating speed measuring means other than an encoder or a resolver may be used for measuring the rotating speed of the rotor of the synchronous motor 21. The rotating speed measuring means may be an observer capable of measuring the rotating speed of the rotor. The observer calculates a rotating speed on the basis of a current flowing through the synchronous motor 21. The position control unit 30, the speed control unit 31 and the current control unit 32 of the controller 24 can be realized by known techniques.

Basically, the foregoing embodiments calculates the desired d-axis current $I_{dc}$ on the basis of the rotating speed ω and the desired torque by using Expression (8). However, the desired d-axis current $I_{dc}$ may be calculated on the basis of the rotating speed ω and the desired torque by using an expression other than Expression (8), such as $I_{dc} = \alpha \cdot I_{qc} (\omega - \omega_{m1})$, where α is a predetermined constant or a variable.

Although the foregoing embodiments use the permissible current and the permissible voltage for the synchronous motor 21, the desired q-axis current $I_{qc}$, the desired d-axis current $I_{dc}$, the desired q-axis voltage $V_q$ and the desired d-axis voltage $V_d$ may be determined on the basis of permissible values specified by other hardware, such as an inverter circuit.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A synchronous motor control method of controlling a synchronous motor by determining a current to be supplied to the synchronous motor based on a value obtained through a d-q-axis transformation of a current flowing through the synchronous motor, comprising:

determining a desired q-axis current corresponding to a q-axis current of the synchronous motor based on a desired torque corresponding to an output torque of the synchronous motor with keeping a desired d-axis current corresponding to a d-axis current of the synchronous motor at zero, until a terminal voltage of the synchronous motor reaches a predetermined maximum permissible voltage; and determining the desired q-axis current based on the desired torque and determining the desired d-axis current based on a rotating speed of the synchronous motor and the desired torque, when the terminal voltage of the synchronous motor has reached the predetermined maximum permissible voltage.

2. The synchronous motor control method according to claim 1, wherein the desired d-axis current is determined so as to meet a condition expressed by:

$$I_{dc}=I_{qc}\cdot\tan\{K_1\cdot(\omega-\omega_{m1})\}$$

where $\omega_{m1}$ is a specified rotating speed of the synchronous motor producing a maximum torque when the terminal voltage is equal to the predetermined maximum permissible voltage, $\omega$ is the rotating speed of the synchronous motor, $K_1$ is a predetermined constant or a variable, $I_{qc}$ is the desired q-axis current determined based on the desired torque and $I_{dc}$ is the desired d-axis current.

3. The synchronous motor control method according to claim 1, wherein, when a determined desired d-axis current exceeds a maximum field-weakening current which limits weakening a magnetic field created in the synchronous motor, the desired d-axis current is redetermined so as to be equal to the maximum field-weakening current.

4. The synchronous motor control method according to claim 1, wherein, when a determined desired d-axis current exceeds a maximum field-weakening current which limits weakening a magnetic field created in the synchronous motor, the desired d-axis current is redetermined so as to be equal to the maximum field-weakening current.

5. The synchronous motor control method according to claim 1, wherein, when a current flowing through the synchronous motor according to determined desired q-axis and d-axis currents exceeds a predetermined maximum permissible current, the desired d-axis current is redetermined so that a current supplied to the synchronous motor is not higher than a maximum permissible current without changing the desired q-axis current determined based on the desired torque, and an adjusted desired q-axis voltage corresponding to a q-axis component of the terminal voltage of the synchronous motor is determined by subtracting a compensating voltage determined for the rotating speed from a desired q-axis voltage determined based on the desired q-axis current.

6. The synchronous motor control method according to claim 5, wherein the compensating voltage is determined so as to meet a condition expressed by:

$$V_{qe}=K_2\cdot\omega\cdot I_{qc}+K_3\cdot\omega\cdot I_d$$

where $I_{qc}$ is the desired q-axis current, $I_d$ is the d-axis current flowing through the synchronous motor, $\omega$ is the rotating speed of the synchronous motor, $K_2$ and $K_3$ are predetermined constants or variables and $V_{q3}$ is the compensating voltage.

7. A synchronous motor control system for controlling a synchronous motor by determining a current to be supplied to the synchronous motor based on a value obtained through a d-q-axis transformation of a current flowing through the synchronous motor, comprising:

a speed measuring means for measuring a rotating speed of the synchronous motor; and an arithmetic means for determining desired q-axis and desired d-axis currents to be supplied to the synchronous motor so that the rotating speed coincides with a desired rotating speed;

wherein the desired q-axis current corresponding to a q-axis current of the synchronous motor is determined based on a desired torque corresponding to an output torque of the synchronous motor with keeping the desired d-axis current corresponding to a d-axis current of the synchronous motor at zero when a measured rotating speed measured by the speed measuring means is not higher than a specified rotating speed at which the synchronous motor produces a maximum torque when a terminal voltage of the synchronous motor coincides with a predetermined maximum permissible voltage, and the desired q-axis current is determined based on the desired torque, and the desired d-axis current is determined based on the rotating speed of the synchronous motor and the desired torque when the measured rotating speed measured by the speed measuring means is higher than the specified rotating speed.

* * * * *